United States Patent [19]

Siegal

[11] 4,234,936
[45] Nov. 18, 1980

[54] POWER SEAT MEMORY

[76] Inventor: Burton L. Siegal, 7605 N. Tripp St., Skokie, Ill. 60076

[21] Appl. No.: 36,006

[22] Filed: May 4, 1979

[51] Int. Cl.³ ............................................. G11C 13/00
[52] U.S. Cl. .................................. 365/244; 74/568 M
[58] Field of Search ...................... 365/244; 74/568 M

[56] References Cited
U.S. PATENT DOCUMENTS 3,839,925  10/1974  Ficken et al. ...................... 74/568 M Primary Examiner—Terrell W. Fears
Attorney, Agent, or Firm—Hill, Van Santen, Steadman, Chiara & Simpson

[57] ABSTRACT

A memory and control device utilizes rotating cams for moving a positionable device, such as a power seat, to pre-set positions and selectively repositioning the device to such pre-set positions, and is also provided with a manual control means to position the seat in any selected orientation. A different motor is utilized for each of the three directions of actuation associated with the device, each of said motors being controlled by solenoid actuated contacts so that the high current required to operate the motors does not pass through switches operating the motors. The switches may be disposed in a control panel and may be actuated by finger depression of actuation areas positioned and marked to correspond to the desired positioning direction.

9 Claims, 5 Drawing Figures

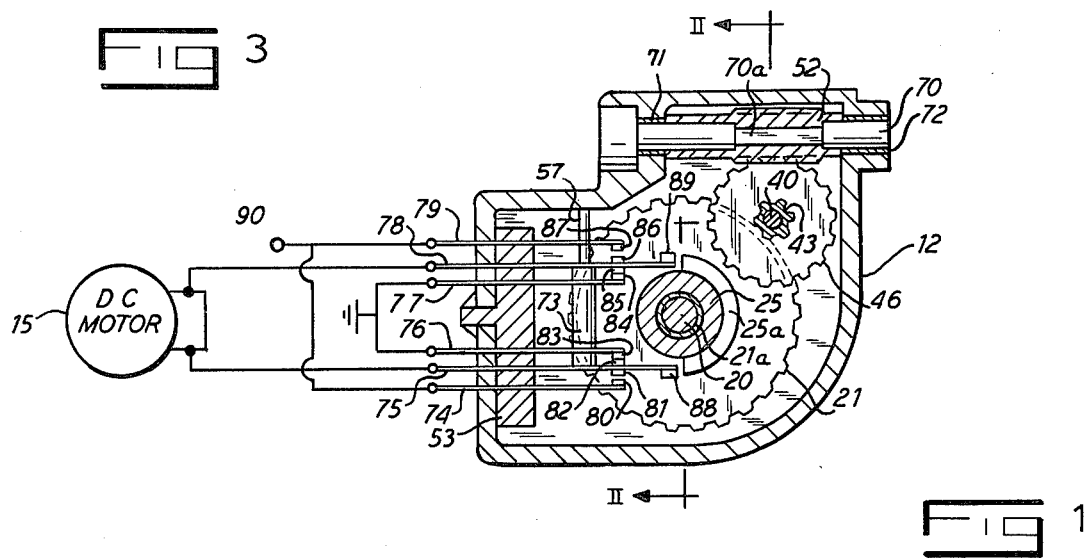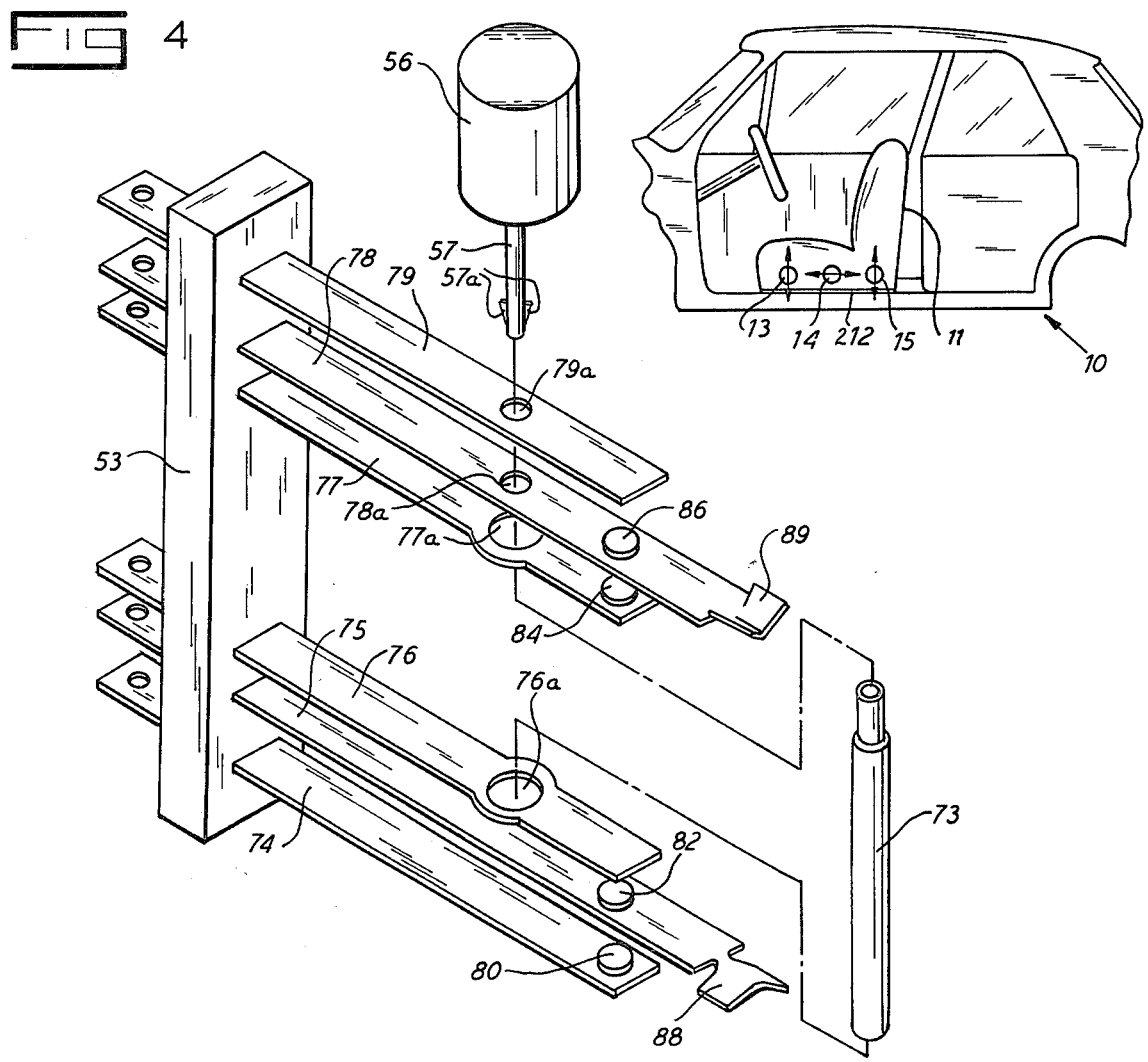

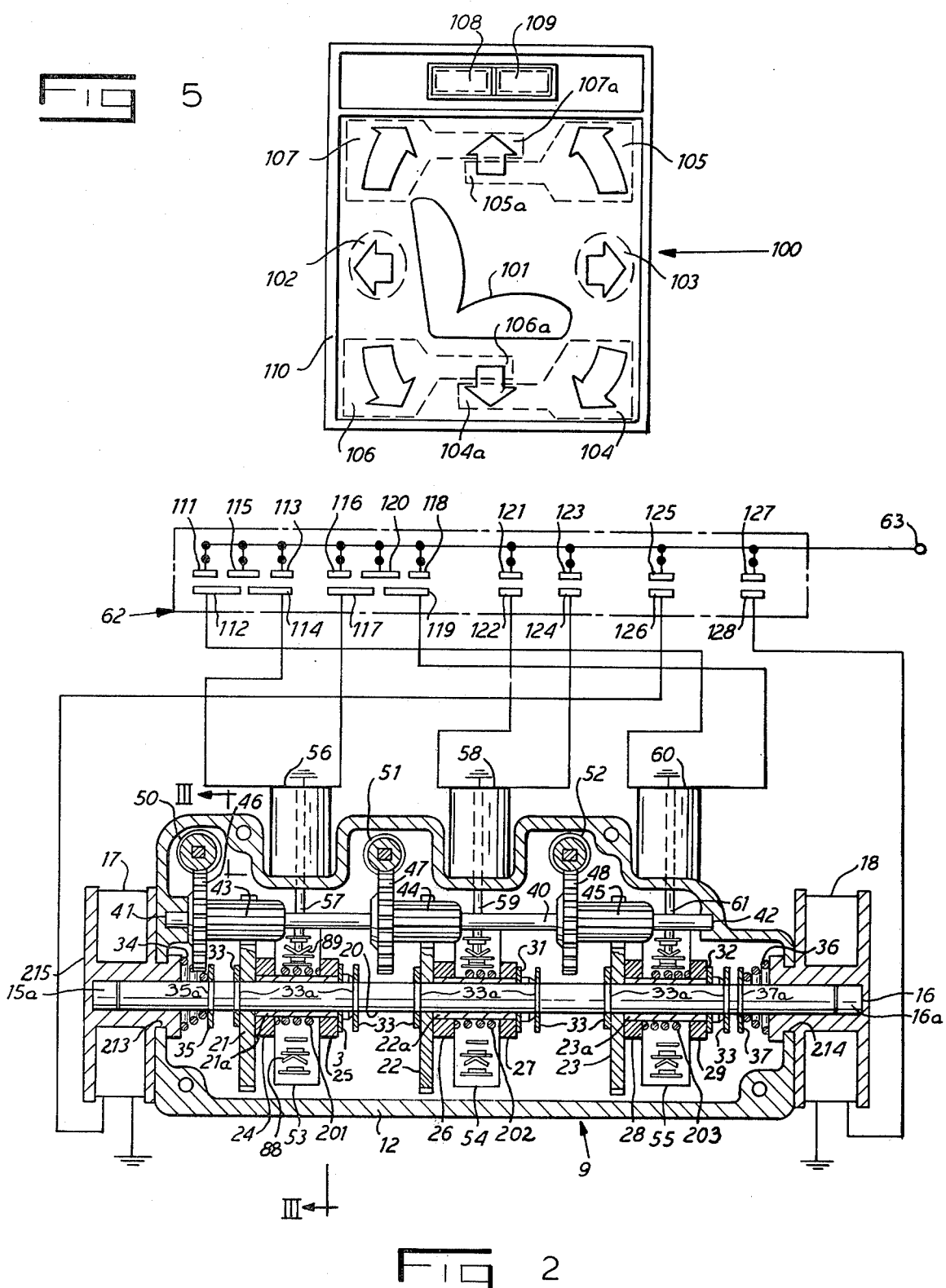

POWER SEAT MEMORY

CROSS REFERENCES TO RELATED PATENTS

This application is related to patents entitled "Memory And Control Device", U.S. Pat. No. 3,472,978, issued Oct. 4, 1969 to Peter C. Granata, Jr., Burton L. Siegal and Edward J. Zeissler; and "Memory And Control Device", U.S. Pat. No. 3,597,554, issued Aug. 3, 1971 to Burton L. Siegal; and "Memory And Control Device With Cams Which Act In Both Radial And Axial Directions", U.S. Pat. No. 3,626,130, issued Dec. 7, 1971 to Burton L. Siegal.

BACKGROUND OF THE INVENTION

1. Field of the Invention

The present invention relates to automatic positioning devices, and in particular to such devices for automatically positioning a power seat to pre-determined positions.

2. Description of the Prior Art

The positioning of six-way power seats, of the type commonly used in automobiles, has previously been accomplished by manual adjustment utilizing three control motors associated with three respective positioning axes. Because automobiles are often utilized by more than one person, the above referenced related patents included a memory control system which automatically positions a seat to a pre-set position selected by each of the different drivers, thereby eliminating the necessity for manual adjustment of all three control motors each time a different person uses the automobile.

In each of the above referenced patents, the switches actuating the control motors were connected in-line with the memory contacts and the motors, so that the switches were required to handle the high amperage current associated with the motors. The switches utilized in those patents are simply movable in two directions, for forward and reverse operation of the associated control motor. The switches thus provided no visual or tactile association corresponding to the resulting seat positioning which would occur by actuation of the switches.

SUMMARY OF THE INVENTION

In accordance with the present invention, an electromechanical memory positioning system utilizing cams can be preset to any desired position and thereafter repositioned to the pre-set position by actuation of a single switch. Three control motors, representing each axis of orientation, are connected for both automatic and manual positioning.

A plurality of solenoid actuated contacts are provided in association with each pair of cams, for automatic and manual positioning of the cam to control one axis of position. The cams are rotatably mounted on a laterally movable shaft, so that lateral movement of the shaft in a first direction engages cams associated with a pre-set position for a first user, and movement of the shaft in a second, opposite direction positions a second set of cams associated with a pre-set position for a second user, thus providing a two-position memory.

This improvement accomplishes all of the motor switching with the solenoid actuated contacts within the memory unit. By using a push-pull solenoid coil with an insulated actuator spaced between two extended switch contacts wired to the motor, manual switch-controlled coils will operate the switch contacts of the memory unit exactly as if actuated by the cams. This improvement allows the electrical current of the motor to flow through a total of only two contacts when controlled by either the manual switches or the cams.

Should the memory and manual switch be operated at the same time giving contrary directions to the motor, the two leads of the motor will be connected to a voltage supply so that no damage or motion will occur.

The total system wiring is greatly simplified and all heavy wiring is short and direct from the motor to the directly coupled memory. Because the manual switches will only have to control a very low current draw coil, the use of smaller, simpler, less expensive switches is facilitated.

One such low-current switch which may be utilized is a piezo-electric switch that has actuation areas thereon which are operable to actuate respective control motors by depression of a user's finger on the areas marked to correspond to the desired positioning direction.

BRIEF DESCRIPTION OF THE DRAWINGS

FIG. 1 is a side elevational diagrammatic representation of an automobile with an adjustable power seat controlled by the positioning system of the present invention.

FIG. 2 is a sectional view of the control memory unit of the present invention.

FIG. 3 is a sectional view of the control memory unit taken along line III—III of FIG. 2.

FIG. 4 is an exploded perspective view of solenoid actuated movable contacts for operating one of the control motors.

FIG. 5 is a plan view of a control panel for operating the present invention.

DESCRIPTION OF THE PREFERRED EMBODIMENTS

An automobile 10 is shown in partial cut-away in FIG. 1 having a power adjustable seat 11 which moves on rails 212 and has position adjusting motors 13, 14 and 15. The motor 13 moves the front portion of the seat 11 up and down, the motor 14 moves the seat 11 backward and forward, and the motor 15 moves the rear portion of the seat 11 up and down. By selected adjustment of the three motors 13, 14, and 15, the seat 11 may thus be moved backward and forward and tilted and raised and lowered.

A memory system 9 for controlling the operation of the motors 13, 14 and 15 is shown in FIG. 2. The system 9 includes a housing 12, having apertures 213 and 214 at opposite ends thereof for respectively receiving solenoid insulators 215 and 16 having flanged ends for mating with the apertures 213 and 214. A solenoid coil 17 is wound on the solenoid insulator 215 and a solenoid coil 18 is wound on the solenoid insulator 16. A shaft 20 is received in receptacles 15a and 16a in the insulators 215 and 16 allowing for lateral movement of the shaft 20.

A spring 34 surrounds the shaft 20 between the solenoid insulator 215 and a snap ring 35 seated in a groove 35a to resist movement of the shaft 20 toward the left as viewed in FIG. 2. An identical spring 36 is disposed around the shaft 20 between the solenoid insulator 16 and a snap ring 37 seated in a groove 37a to oppose movement of the shaft 20 in the opposite direction.

The shaft 20 supports three separate identical sets of positioning mechanisms. Gears 21, 22 and 23 are mounted on the shaft 20 for free rotation with respect thereto, and have co-rotatably attached respective collars 21a, 22a and 23a. A pair of cams 24 and 25 are mounted on the collar 21a for free rotation with respect thereto, and cams 26 and 27 are similarly mounted on the collar 22a and the cams 28 and 29 are mounted on the collar 23a. Friction plates 30, 31 and 32 respectively abut one side of cams 25, 27 and 29. Friction plates 30, 31 and 32 are axially retained on, and co-rotate with, collars 21a, 22a and 23a respectively. Cams 24 and 25 are urged against gear 21 and frictional plate 30 by a spring 201 so that the cams 24 and 25 will frictionally engage and rotate with gear 21 and friction plate 30. Springs 202 and 203 perform a similar function with cam pairs 26, 27 and 28, 29 respectively. Each positioning assembly is held laterally in place with respect to the shaft 20 by two snap rings 33 seated in grooves 33a.

The gears 21, 22 and 23 respectively mesh with small diameter gears 43, 44 and 45 independently rotatably supported on a shaft 40. The shaft 40 is mounted in the housing 12 at receptacles 41 and 42. Large diameter gears 46, 47 and 48 are respectively co-rotatably attached to the gears 43, 44 and 45. The large diameter gears 46, 47 and 48 engage respective worms 50, 51 and 52 which are drivingly connected to respective motors 15, 14 and 13.

It will be understood that the driving connections of the positioning mechanisms to the respective motors need not be identically as shown in FIG. 2, as is also the case with the switching connections described below. Each positioning mechanism controls one motor, and it is not material to the inventive concept herein to require that identical connections always be employed.

Insulating members 53, 54 and 55, each having a plurality of flexible bars mounted therein, are respectively associated with each of the positioning mechanisms. The flexible bars, as more fully described below, carry contacts thereon which are movable into connected and disconnected positions by push-pull solenoids 56, 58 and 60 having respective actuators 57, 59 and 61. The solenoids are controlled by a switching bank 62 for selective connection to a power supply at 63.

The detailed structure of the positioning mechanism at the far left of FIG. 2 is shown in FIG. 3, however, it will be understood that identical structure comprises the remaining positioning mechanisms. A shaft 70 is drivingly connected to the motor 15 and journaled for rotation in the housing 12 at 71 and 72. The shaft 70 has a square portion 70a extending through the worm 50 for co-rotation therewith. As previously described, a feedback train from the motor 15 is comprised of the worm 50, the large diameter gear 46, the small diameter gear 43 and the gear 21.

A plurality of flexible bars 74, 75, 76, 77, 78 and 79 are horizontally mounted in the insulating member 53 and have portions extending into the interior of the housing 12 having electrical contacts mounted thereon. The bar 74 has a contact 80 mounted on a top thereof, for engagement with a contact 81 mounted on the bottom of the bar 75. The bar 75 also has a contact 82 mounted on the top thereof for engagement with a contact 83 mounted on the bottom of the bar 76. The bar 77 has a contact 84 mounted on the top thereof for engagement with a contact 85 mounted on the bottom of the bar 78. The bar 78 also has a contact 86 mounted on the top thereof for connection with a contact 87 mounted on the bottom of the bar 79. The bars 75 and 78 have respective cam followers 88 and 89 mounted on extended ends thereof. The cam followers 88 and 89 are of a V-shaped cross-section, as shown in FIG. 2. When the shaft 20 is in the central position shown in FIG. 2, the cam surface 25a does not engage either of the cam followers 88 or 89 so that the contacts 82 and 83 are normally connected, as are the contacts 84 and 85. The contacts 80 and 81, and 86 and 87 are normally not in connection.

Opposite ends of the flexible bars extend outside of the housing 12 and provide terminals for electrical connections. The bars 76 and 77 are both connected to ground, the bars 75 and 78 are connected to terminals of the DC motor 15, and the bars 74 and 79 are both connected to a terminal 90 leading to a high amperage power supply (not shown).

As shown in greater detail in FIG. 4, the actuator 57 of the solenoid 56 is connected to an insulating sleeve 73 having a larger outside diameter than the actuator 57. The actuator 57 has tabs 57a engaging the sleeve 73 so that the sleeve 73 and the actuator 57 move together in the vertical direction.

The bars 76 and 77 have respective holes 76a and 77a of a diameter such that the sleeve 73 moves freely inside the holes. The bars 79 and 78 have respective holes 79a and 78a therein of a smaller diameter than the holes 77a and 76a, such that the actuator 57 may freely move in the holes 79a and 78a, but the sleeve 73 may not. Abutment of the sleeve 73 against the bar 78 will thus make and break the contact pairs 86 and 87, and 84 and 85, respectively. Similarly, abutment of the bottom of the sleeve 73 against the bar 75 will make and break the contact pairs 83 and 82, and 81 and 80, respectively. Movement of the bars 78 and 75 can also result from engagement of the cam followers 88 and 89 with the cam surface 25a as described below.

Manual and automatic positioning of the seat 11 is accomplished by means of the switching bank 62. The solenoids 56, 58 and 60 are energized by selected depression of the switches in the bank 62. Up and down movement of the rear motor 15 is accomplished by connection of the contacts 113 and 114, or 116 and 117, which will cause solenoid 56 to either push or pull actuator 57. Up and down movement of the front motor 13 is accomplished by connection of the contact 111 and 112, or 118 and 119. The motors 13 and 15 can be simultaneously operated in one direction by connection of the contact 115 simultaneously with the contacts 112 and 114. The motors 15 and 13 can be simultaneously operated in the opposite direction by the simultaneous connection of the contact 120 with contacts 117 and 119. Forward and backward operation of the motor 14 is accomplished by connection of the contacts 121 and 122, or 123 and 124. The solenoid 17 is energized by connection of the contacts 125 and 126, and the solenoid 18 is energized by connection of the contacts 127 and 128.

It will be understood that two separately energizable solenoids, each having an actuator, could be utilized in place of each of the push-pull solenoids 56, 58 and 60 without departing from the inventive concept disclosed herein, as could a manually moveable actuator.

Manual positioning of the seat 11 is accomplished as follows. Connection of the contacts in the switching banks 62 in accordance with their above described operation energizes the respective solenoids 56, 58 and 60. For exemplary purposes, operation of the motor 15 as shown in FIG. 3 will be described. When the actuator 57 and sleeve 73 are in the rest position shown in FIG. 3, the DC motor 15 is dynamically braked by virtue of both its leads being connected to ground thru normally closed contacts 84, 85 and 82, 83. Energizing the solenoid 56 to cause an upward movement of the actuator-sleeve combination will pull the bar 78 upward so that an electrical connection is made between the contacts 85 and 86 and broken between contacts 84 and 85, thereby supplying power to the motor 15. As long as the various switches in the bank 62 energize the solenoid 56, such an electrical circuit will be maintained, so that the motor 15 will continus operation until de-energization of the solenoid 56. Similarly, energization of solenoid 56 to cause a downward motion of bar 75 will cause the motor 15 to run in the opposite direction. Similar selected operation of the motors 14 and 15 will position the seat 11 to a desired orientation.

Each of the positioning mechanisms may be selectively pre-set as follows. Actuation of either of the contacts 125 or 127 will energize a respective one of the solenoids 17 or 18. This will move the shaft 20 laterally to the left or right so that ends of each of the cam followers such as 88 and 89 will abut ends of the cam surfaces 25a. The cams abutting the cam followers will thus remain stationary and slip relative to the rotating gear 21 and friction plate 31 while the motors 13, 14 and 15 are operated to adjust the seat 11 to a desired orientation. Thus, one set of cams 24, 26 and 28 can be pre-set to correspond to a first desired position for seat 11, while the solenoid 18 is energized, and a second set of cams 25, 27 and 29 can be pre-set to correspond to a second desired position while the solenoid 17 is energized. After pre-setting has occurred, and the seat 11 has been moved out of the pre-set position, return to the pre-set position is accomplished by again depressing either of the contacts 125 or 127 to again energize one of the solenoids 17 or 18. When lateral movement of the shaft 20 occurs this time, the selected set of cams 24, 26 and 28, or 25, 27 and 29, will move against one of the V-shapes of the cam followers 89 or 88, to cause an electrical circuit to be made to operate the respective motors for the length of time which each cam engages a cam follower. As each cam rotates so that the cam followers return to the rest position as shown in FIG. 3, the respective motor will cease operation.

A control panel 100 coordinated visually and tactilely with the movement of the seat 11 is shown in FIG. 5. The areas represented by dashed lines on the control panels 100 may be constructed of piezo-electric or foil-layer switches as is known in the art. As represented by the various arrows, pressure of a user's finger on a given arrow will move the seat 11 accordingly. A seat outline 101 is centrally disposed on the panel 100 for easy visual reference. Actuation areas 102 and 103 are associated with the contacts 121 and 123 in the switching bank 62 for forward and backward movement of the seat 11, by operation of the motor 14. Similarly, actuation areas 104 and 105 are connected to the contacts 111 and 118 for up and down movement of the front of the seat 11 by operation of the motor 13. Actuation areas 106 and 107 are connected to the contacts 113 and 116 for up and down movement of the rear of the seat 11 by operation of the motor 15. Simultaneous operation of the motors 13 and 15 in one direction is accomplished by depression of the extensions 104a and 106a, represented by the contact 115 in the switching bank 62. Simultaneous operation of the motors 13 and 15 in an opposite direction is accomplished by depression of the extensions 105a and 107a corresponding to the contact 120. Momentary switches 108 and 109 correspond to the contacts 125 and 127 for automatic pre-selected positioning. The entire control panel 100 is surrounded by a border 110.

Use of the control panel 100 in combination with the herein described solenoid actuated position memory system allows a driver or a passenger to more easily position the seat 11, even without visual contact with the panel 100. The various actuation areas on the panel 100 are disposed such that their placement on the panel 100 corresponds to the expected seat movement. For example, pressing one's finger on a portion of the panel 100 near the rear of the seat outline 101 will result in movement of the seat 11 rearwardly. Again, for example, pressure of one's fingers on the panel 100 in the area immediately in front and below of the seat outline 101, designated by 103, will cause the front of the seat 11 to move downward. It is thus no longer necessary for a user to remember specifically the direction of seat movement which will result from actuation of one of a number of conventional, uncorrelated switches.

Although various modifications and changes relating to this invention may be apparent to those skilled in the art, it is the intention of the applicant to embody within the patent warranted hereon all such changes and modifications as reasonably and properly come within the scope of the inventor's contribution to the art.

I claim as my invention:

1. In an electro-mechanical memory-positioning system comprising:

an electrically energizable drive means mechanically connectable to a positionable device to move the device to a pre-determined position when the device is displaced therefrom;

at least one pair of cams connected to said drive means movable in response to movement of the positionable device, said cams mounted on a shaft side by side for rotation about their axes and for selective movement longitudinal of their axes;

at least a pair of cam followers mounted between each said pair of cams;

a pair of switch means mechanically mounted on said cam followers for movement therewith, said switch means including contacts to electrically connect said drive means to a power supply; and means for moving each said pair of cams longitudinally of their axis such that when moved in a first direction one of said cams engages one of said cam followers to cause said drive means to move said positionable device in a first direction to a first pre-determined position or said cam engages the other switch actuator to cause said drive means to move said positionable device in a second direction to said first pre-determined position; the improvement of:

at least one solenoid having a manually operable switch for selective energizing of said solenoid, having an actuator mechanically connected to said switch means to move said switch means upon energizing of said solenoid to open and close said switch means.

2. The improvement of claim 1 wherein said drive means includes two independently operable reversible motors respectively connected to two pairs of cams and associated cam followers and switch means, each operable by selective energization of at least one solenoid to move said positionable device in four directions.

3. The improvement of claim 1 wherein said drive means includes three independently operable reversible motors respectively connected to three pairs of cams and associated cam followers and switch means, each operable by selective energization of at least one solenoid to move said positionable device in six directions.

4. The improvement of claim 1 wherein said positionable device is an automobile seat and said drive means are operable to move said seat forward and rearward, to tilt said seat, and to move said seat up and down.

5. The improvement of claim 1 including a control panel containing said solenoid switches which has actuation areas operable to cause said positionable device to move in a direction corresponding to the location of a user's finger when activating the control panel.

6. The improvement of claim 5 wherein said control panel has actuation areas actuatable to cause said drive means to position said positionable device in said first pre-determined position.

7. The improvement of claim 5 wherein said actuation areas are moveable parts of foil-layers switches.

8. The improvement of claim 5 wherein said actuation areas are moveable parts of piezo-electric switches.

9. The improvement of claim 1 wherein the solenoid is a push-pull type.

* * * * *